Feb. 17, 1970   C. E. BRANICK   3,495,647
SAFETY CAGE FOR POSTINFLATION APPARATUS
Filed March 15, 1967   2 Sheets-Sheet 1
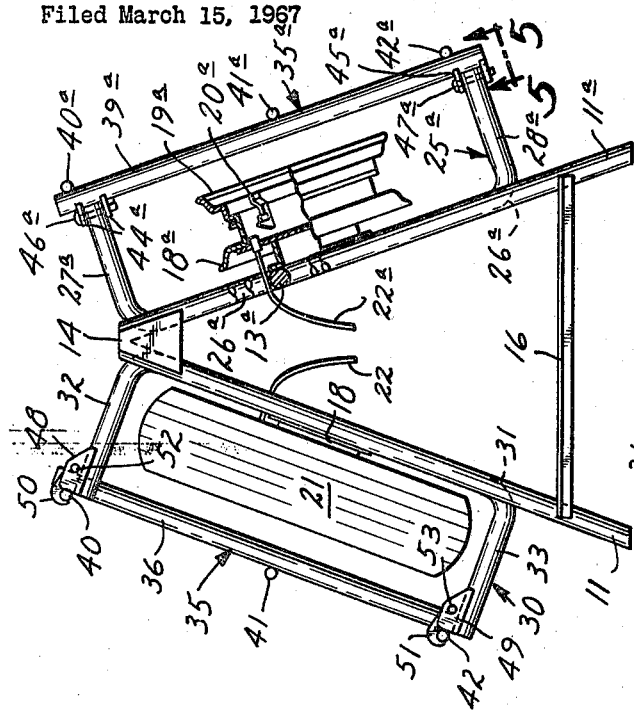
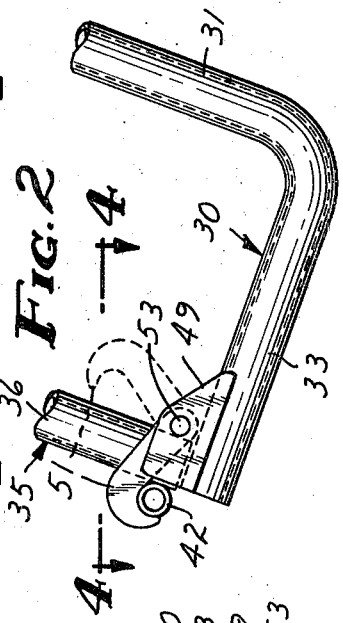
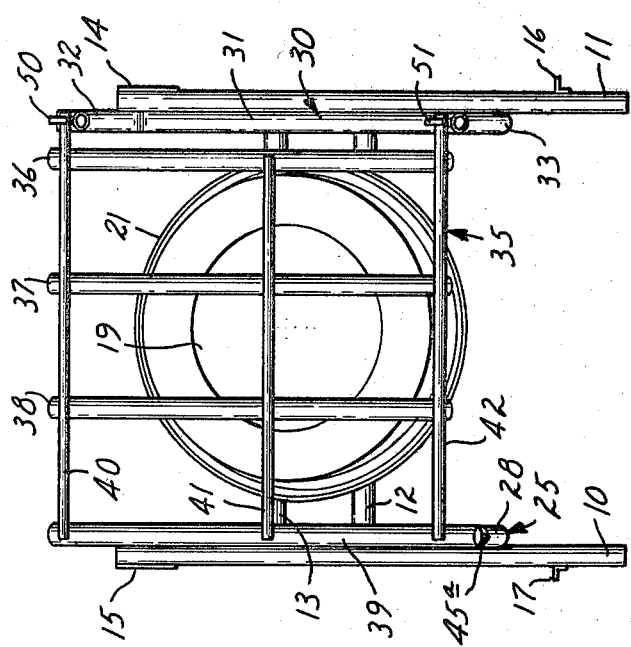
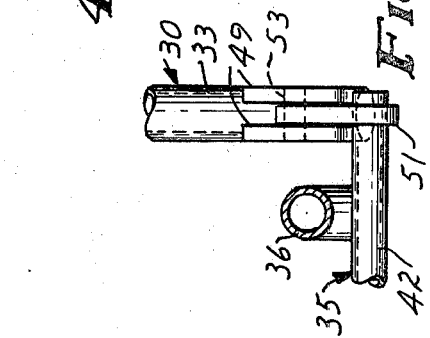
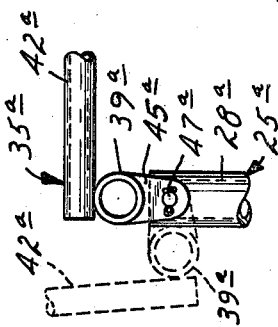
INVENTOR.
CHARLES E. BRANICK
BY Merchant & Gould
ATTORNEYS

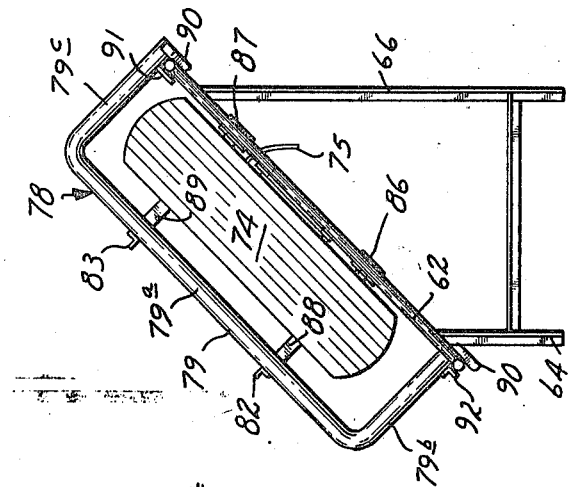
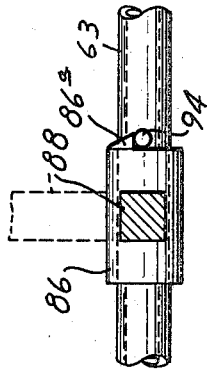
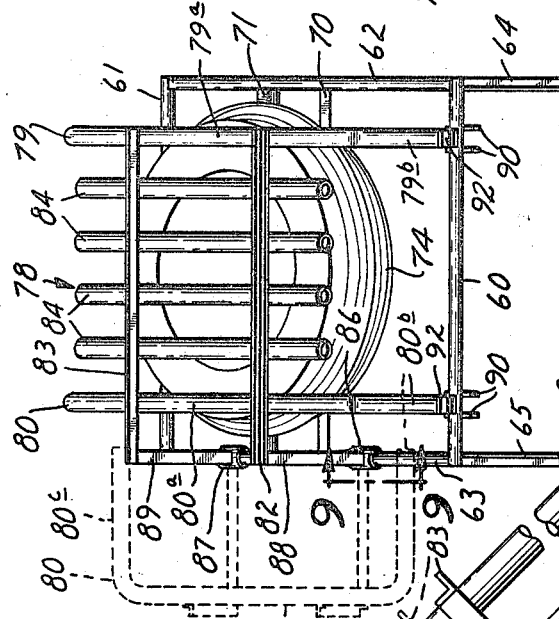
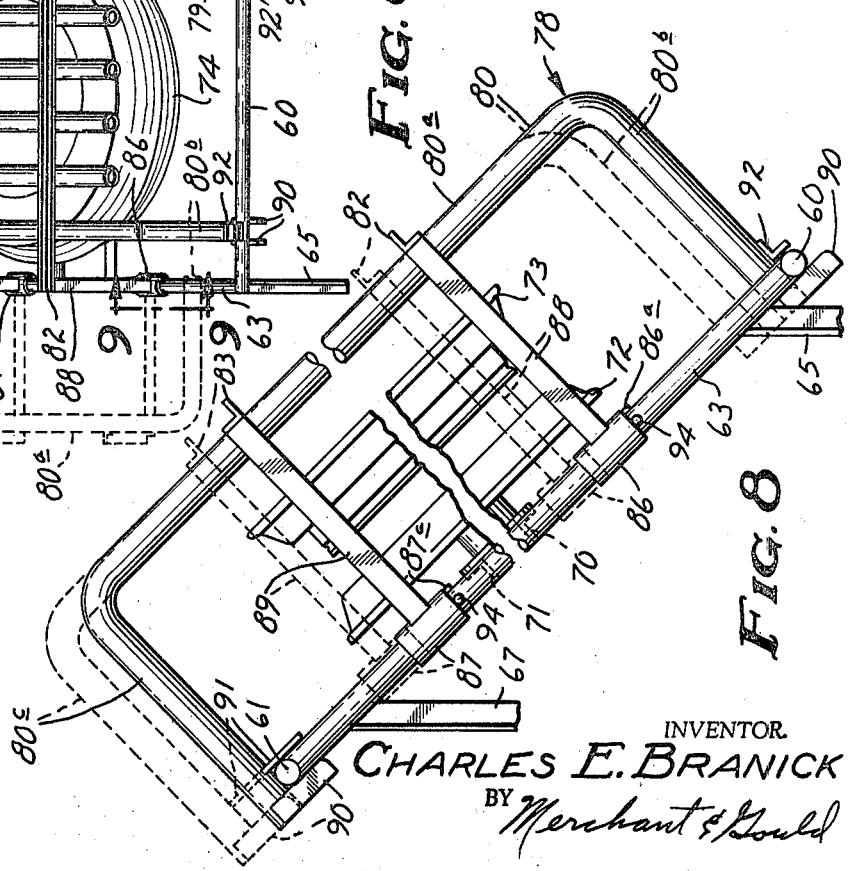

United States Patent Office 3,495,647
Patented Feb. 17, 1970

1

3,495,647
SAFETY CAGE FOR POSTINFLATION APPARATUS
Charles E. Branick, Fargo, N. Dak., assignor to Applied Power Industries, Inc., Milwaukee, Wis., a corporation of Wisconsin
Filed Mar. 15, 1967, Ser. No. 623,308
Int. Cl. B29h *17/00, 17/02*
U.S. Cl. 157—1        9 Claims

ABSTRACT OF THE DISCLOSURE

An apparatus for inflating a pneumatic tire immediately after molding to stretch the cords thereof and for holding the tire inflated for cooling with the cords in a stretched condition. Releasable safety cage means are attached to the postinflation apparatus to provide protection for an operator while the tire is inflated.

BACKGROUND OF THE INVENTION

*Field of the invention*

This invention relates generally to postinflating machines for pneumatic tires and more particularly relates to an improved safety cage device for such machines that will protect an operator during the time that the tire is inflated.

*Description of the prior art*

It is common practice in the manufacture of pneumatic tires to subject each tire to a post inflation operation after it is removed from the molding machine or press. The newly manufactured tire is placed between a pair of rim sections that are designed to sealingly engage the beads at the opposite side edges of the tire. With the rim sections supporting the tire, it is inflated to a substantially higher pressure than would be used in normal operating conditions to stretch the tire cords a predetermined amount.

The postinflation machine maintains the high inflation pressure until the tire has cooled so that the tire is cured with the cords in a stretched condition. This postinflation operation is especially necessary in the case of tires having nylon cords, since nylon tends to stretch to an undesirable degree with usage of the tire. Stretching the tire during the curing process thus prevents undesirable tire growth or stretching during normal usage.

Since the tire is inflated to such a high pressure during the postinflation operation, it is subject to abnormally high forces tending to cause the tire to explode. If the construction of a newly molded tire is at all defective, the tendency of the tire to explode when pressure is applied is greatly increased. If such tire does blow out when the high pressure is applied, it is possible that the upper rim section will be thrown toward the operator at a high velocity. An accident of this kind thus poses a danger to an operator in the vicinity of the machine.

SUMMARY OF THE INVENTION

My invention provides a safety cage for attachment to a postinflation machine. A heavy screen is mounted on the machine so that it can be locked in position over the tire during the inflation of the tire and can be rotated to an open position in which the tire can easily be inserted and removed. Two embodiments of my invention are disclosed in this application.

BRIEF DESCRIPTION OF THE DRAWINGS

FIGURE 1 is a plan view of a postinflation machine incorporating a first embodiment of my invention;

2

FIGURE 2 is a side view thereof, portions being broken away and portions being shown in section;

FIGURE 3 is an enlarged fragmentary view of the locking means for releasably securing the safety screen of my invention;

FIGURE 4 is a view taken substantially along lines 4—4 of FIGURE 3, portions thereof being broken away and portions being shown in section;

FIGURE 5 is an enlarged fragmentary view taken substantially along line 5—5 of FIGURE 2 showing one of the hinge means of my invention and showing the safety screen in the open position and in the closed position;

FIGURE 6 is a plan view of a postinflation machine incorporating a second embodiment of my invention with the safety screen thereof being shown in the closed position in full lines, and being shown in the open position in dashed lines;

FIGURE 7 is a side view of a postinflation machine incorporating the second embodiment of my invention;

FIGURE 8 is an enlarged side view of a postinflation machine incorporating the second embodiment of my invention, portions thereof being broken away, showing the safety cage in the locked closed position in full lines, and showing the safety cage in the unlocked closed position in dashed lines; and FIGURE 9 is an enlarged fragmentary view taken substantially along line 9—9 of FIGURE 6, portions thereof being broken away and portions being shown in section.

DESCRIPTION OF THE PREFERRED EMBODIMENTS

Referring now to the drawings, there is disclosed in FIGURES 1–5, a first embodiment of my inventive safety cage for postinflation machines. As best shown in FIGURE 2, the basic machine is a dual postinflation machine capable of inflating two tires at the same time. Since each half of the dual machine is identical to the other, the following description will be made in terms of a single postinflation machine adapted to inflate a single tire. It will be understood that the other half of the machine is identical thereto.

The postinflation machine includes a base member comprising a pair of floor engaging end supports 10 and 11 and a pair of parallel cross braces 12 and 13. For the purposes of identification, the same structure on the other half of the dual postinflation machine will be given the same numerals together with the letter *a*.

End supports 11 and 11*a* are connected at the top by a plate member 14, while end supports 10 and 10*a* are connected at the top by means of a plate member 15. Similarly, end supports 11 and 11*a* are connected near their bottom ends by a horizontal member 16, while end supports 10 and 10*a* are similarly connected by a horizontal member 17. The two base members thus form an A frame that is quite rigid and capable of standing by itself.

Mounted near the center of cross braces 12*a* and 13*a*, by welding or the like, is a lower rim section 18*a* adapated to engage the lower bead of a pneumatic tire placed thereon. An upper rim section 19*a* is mounted on lower rim section 18*a* by means of a plurality of releasable connector devices 20. Upper rim section 19*a* is adapted to engage the upper bead of a pneumatic tire mounted between the rim sections. Air under pressure is inserted into the mounted tire 21 by means of a tube 22 connected to lower rim section 18.

Attached by welding or the like to end suports 10 and 11 are a first base extension member 25 and a second base extension member 30. Cross braces 12 and 13 are in turn welded to base extension members 25 and 30. Base extension members 25 and 30 are mounted on opposite sides of rim sections 18 and 19 a distance apart greater than the diameter of tire 21, in this case directly adjacent end supports 10 and 11. Base extension member 25 includes a first portion 26 connected to cross braces 12 and 13 and extending parallel to end support 10. Extending outwardly from the ends of first portion 26 are a pair of upstanding end portions 27 and 28. Second base extension member 30 includes a first portion 31 attached to cross braces 12 and 13 and extending parallel to end support 11. Extending outwardly from the ends of first portion 31 are a pair of upstanding end portions 32 and 33.

A rigid safety screen 35 extends between base extension members 25 and 30 above the upper side wall of tire 21 to shield an operator therefrom. Screen 35 includes a first group of spaced apart screen members 36, 37, 38, and 39 that lie in parallel with base extension members 25 and 30, and a second group of spaced apart screen members 40, 41, and 42 lying perpendicular thereto. The first and second groups of screen members are securely attached to each other to form the rigid screen 35.

As best shown in FIGURE 2, safety screen 35a is connected to first base extension member 25a for swinging movements between an open position and a closed position, these two positions of the safety screen being shown in FIGURE 5. Welded or otherwise attached to the opposite ends of screen member 35a are two pairs of hinge plates 44a and 45a that are adapted to fit over end portions 27a and 28a respectively. A pair of pins 46a and 47a extend through corresponding holes formed in the hinge plates and end portions.

Means are also provided to releasably secure safety screen 35 to base extension member 30 when in the closed position. Welded or otherwise attached to end portions 32 and 33 are two pairs of hook brackets 48 and 49. A pair of hook members 50 and 51 are mounted in hook brackets 48 and 49 respectively by means of pins 52 and 53. Hook members 50 and 51 can thus be pivoted about pins 52 and 53 in the manner shown in FIGURE 3. Hook members 50 and 51 are further adapted to engage screen members 40 and 42 respectively to lock screen 35 in the closed position during inflation of tire 21. When the postinflation operation is completed, hook members 50 and 51 are rotated to the dashed line position shown in FIGURE 3 to release screen 35 so that screen 35 can be swung to the open position about the previously described hinge means.

Referring now to FIGURES 6-9, there is disclosed a second embodiment of my invention. The base member for this apparatus is generally rectangular and includes a pair of generally parallel tubular side frames 60 and 61, and a pair of generally parallel tubular end frames 62 and 63 rigidity attached thereto. A pair of relatively short floor engaging legs 64 and 65 are attached to the front corners of the base member, and a pair of longer floor engaging legs 66 and 67 are attached to the rear of the base member to support the apparatus in the position shown.

A pair of parallel cross braces 70 and 71 are mounted between end frames 62 and 63 to provide support for a lower rim section 72 mounted centrally thereon. An upper rim section 73 cooperates with lower rim section 72 to hold a pneumatic tire 74 therebetween for the postinflation operation. A tube 75 is provided for pressurizing tire 74.

Mounted on the base member is a safety cage 78 designed to protect an operator while tire 74 is inflated. Safety cage 78 includes first and second generally parallel base extension members 79 and 80 that are adapted to be releasably mounted on opposite sides of rim sections 72 and 73 on the base member. Base extension members 79 and 80 extend outwardly from the base member a distance greater than the upper side wall of tire 74. Base extension member 79 includes a first portion 79a generally equal in length to end frame 62, and a pair of downwardly extending end portions 79b and 79c that terminate adjacent side frames 60 and 61. Base extension member 80 also includes a first portion 80a and a similar pair of downwardly extending end portions 80b and 80c.

A pair of generally parallel spaced apart screen members 82 and 83 are attached to the upper surfaces of base extension members 79 and 80, perpendicular thereto. Rigidly attached to screen members 82 and 83, perpendicular thereto, are another group of spaced apart screen members 84. Screen members 82, 83 and 84 form a rigid safety screen that cover tire 74 to protect the operator during inflation thereof. It can be seen that screen members 82, 83 and 84, and base extension members 79 and 80 form safety cage 78.

Safety cage 78 is connected to the base member by hinge means so that it can be swung from the closed position shown in full lines in FIGURE 6 to the open position shown in dashed lines in FIGURE 6. As previously mentioned, end frame 63 is of a tubular construction. Mounted on end frame 63 for rotation and for longitudinal sliding movement are a pair of tubular hinge members 86 and 87. Attached to hinge members 86 and 87 are hinge extension members 88 and 89 that extend outwardly therefrom perpendicular to end frame 63. Hinge extension members 88 and 89 extend upwardly from the base member and are rigidly secured to screen members 82 and 83. Hinge extension members 88 and 89 thus support cage 78 during movements thereof between its open and closed positions.

Safety cage 78 is designed so that it can be locked in the closed position over tire 74. As best shown in FIGURE 8, safety cage 78 is longitudinally slidable with respect to end frames 62 and 63 from a first position shown in full lines in FIGURE 8 to a second position shown in dashed lines in FIGURE 8. During movements of cage 78 between its first and second position, tubular hinge members 86 and 87 move axially along end frame 63.

Each of the end portions 79b, 79c, 80b, and 80c are provided with a stop member 90 rigidly attached to the end thereof and extending perpendicular to the end portion in a forward direction. Stop members 90 are situated such that they lie directly below side frames 60 and 61 with the closed cage 78 in its first position. To provide support for safety cage 78 when in the closed position, each of the end portions 79b, 79c, 80b, and 80c is provided with a lug member, such as 91 or 92. Lug members 91 and 92 are spaced from stop members 90 a distance equal to the outside diameter of side frames 60 and 61. Lug members 91 and 92 extend in the same direction as stop members 90, and lie parallel thereto. Thus, in the closed position of cage 78, as shown in full lines in FIGURE 8, cage 78 is secured from upward movement by means of stop members 90 and is secured from downward movement by lug members 91 and 92. To open cage 78, it is first moved longitudinally with respect to end frames 62 and 63 to the dashed line position of FIGURE 8, in which position stop members 90 no longer lie beneath side frames 60 and 61. At this point, safety cage 78 can be rotated to the open position about end frame 63 by means of tubular hinge members 86 and 87.

If desired, tubular hinge members 86 and 87 can be constructed as most clearly shown in FIGURE 9 to limit the amount of rotation of members 86 and 87 with respect to end frame 63. In such case, hinge members 86 and 87 each carry an axial extension portion 86a and 87a that are designed to abut against a pin such as 94 that extends from end frame 63. Pins 94 prevent hinge members 86 and 87 from rotating beyond a certain point so that safety cage 78 is held in a predetermined opened position.

From the above description, it will be come apparent that I have invented new and useful safety apparatus for postinflation machines. Since it is possible that modifications might be made without departing from the invention, I intend to be bound only by the appended claims.

I claim:

1. A postinflation apparatus comprising a base member having pneumatic tire rim means having at least a portion thereof ridgidly mounted thereon to support a pneumatic tire thereon during postinflation of the tire, displaceable safety screen means disposed above the pneumatic tire rim means during inflation of a pneumatic tire, the safety screen means being supported above the pneumatic tire rim means by base extension means connected to the base member, and releasable securement means connected between the base member and the safety screen means to permit displacement of the safety screen means with respect to the base member upon completion of the postinflation of a tire.

2. In combination with postinflation apparatus having a base member with a lower rim section mounted thereon and an upper rim section cooperable therewith to sealingly engage the beads at the opposite side edges of a pneumatic tire to support said tire during the postinflation thereof, said tire having a predetermined diameter and having a top side wall extending outwardly from said base member a predetermined distance when mounted in said rim sections; a safety case to protect an operator while said tire is inflated, comprising:
   (a) first and second generally parallel base extension members mounted on opposite sides of said rim sections on said base member a distance greater than said pedetermined diameter, and extending outwardly from said base member a distance greater than said predetermined distance;
   (b) a rigid safety screen extending between said base extension members above said mounted tire to shield an operator therefrom;
   (c) means including hinge means connecting said safety screen to said first base extension member for swinging movements between an open position and a closed position; and
   (d) means including locking means for releasably securing said safety screen to said second base extension member when in said closed position.

3. The apparatus of claim 2 wherein said screen includes a first group of spaced apart screen members lying in parallel with said base extension members and a second group of spaced apart screen members lying perpendicular thereto, said first and said second group of screen members being securely attached to each other to form a rigid screen.

4. The apparatus of claim 3 wherein said base extension members each include a first portion securely attached to said base member and a pair of upstanding end portions for supporting said screen, wherein one of said first group of screen members is connected by said hinge means to said pair of end portions of said first base extension member, and wherein a pair of said second group of screen members is releasably secured to said pair of end portions of said second base extension member by said locking means.

5. In combination with a postinflation apparatus having a base member with a lower rim section mounted thereon and an upper rim section cooperable therewith to sealingly engage the beads at the opposite side edges of a pneumatic tire to support said tire during the postinflation thereof, said tire having a top side wall extending outwardly from said base member a predetermined distance when mounted in said rim sections; a safety cage to protect an operator while said tire is inflated, comprising:
   (a) first and second generally parallel base extension members adapted to be releasably mounted on opposite sides of said rim sections on said base member, and extending outwardly from said base member a distance greater than said predetermined distance;
   (b) a rigid safety screen securely mounted on said base extension members above said mounted tire to shield an operator therefrom;
   (c) means including hinge means connecting said safety screen to said base member for swinging movements between an open position and a closed position; and
   (d) means including locking means for releasably securing said base extension members to said base member when in said closed position.

6. The apparatus of claim 5 wherein said screen includes a first group of spaced apart screen members lying in parallel with said base extension members and a pair of spaced apart screen members lying perpendicular thereto, said screen members being securely attached to each other to form a rigid screen.

7. The apparatus of claim 6 wherein said base member is generally rectangular and includes a pair of generally parallel tubular side frames and a pair of generally parallel tubular end frames rigidly attached thereto, said end frames being parallel to said base extension members, wherein said pair of said screen members is connected to one of said end frames by said hinge means, and wherein said base extension members are releasably secured to said side frames by said locking means.

8. The apparatus of claim 7 wherein said hinge means comprise a pair of tubular hinge members mounted for rotation and for longitudinal sliding movements on said end frame and a hinge extension member rigidly attached to each of said hinge members and extending outwardly therefrom perpendicular to said tubular end frame, and wherein said hinge extension members are rigidly secured to said pair of screen members to support said screen and said base extension members during movements thereof between said open position and said closed position.

9. The apparatus of claim 8 wherein said base extension members each include a first portion generally equal in length to said end frames securely attached to said screen, and a pair of downwardly extending end portions that terminate adjacent corresponding side frames, whereein said screen and said base extension members are longitudinally slidable with respect to said end frames from a first position to a second position, wherein each of said end portions has a locking means attached thereto for engaging said side frames in said first position to lock said screen in said closed position, and for disengaging said side frames in said second position to permit said screen to be swung to said open position.

References Cited

UNITED STATES PATENTS

| | | |
|---|---|---|
| 2,201,244 | 5/1940 | Root. |
| 2,229,596 | 1/1941 | Eilers. |
| 2,407,049 | 9/1946 | Winarsky. |
| 2,792,056 | 5/1957 | Ricketts et al. _____ 157—1 |
| 3,018,511 | 1/1962 | Monteith et al. _____ 157—1 X |

THERON E. CONDON, Primary Examiner

NEIL ABRAMS, Assistant Examiner

U.S. Cl. X.R.

18—2